(12) United States Patent
Batcher et al.

(10) Patent No.: US 12,506,693 B2
(45) Date of Patent: Dec. 23, 2025

(54) NETWORK TRAFFIC FLOW CONTROL FOR TIME SENSITIVE NETWORKING (71) Applicant: ROCKWELL AUTOMATION TECHNOLOGIES, INC., Mayfield Heights, OH (US)

(72) Inventors: Kenneth W. Batcher, Hudson, OH (US); Mark R. Hantel, Medina, OH (US); Mark R. Cooper, Eden Prairie, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 480 days.

(21) Appl. No.: 18/074,289

(22) Filed: Dec. 2, 2022

(65) Prior Publication Data
US 2024/0187349 A1    Jun. 6, 2024

(51) Int. Cl.
*H04L 12/00* (2006.01)
*H04L 41/14* (2022.01)
*H04L 47/28* (2022.01)
*H04L 47/56* (2022.01)

(52) U.S. Cl.
CPC ............ *H04L 47/28* (2013.01); *H04L 41/145* (2013.01); *H04L 47/56* (2013.01)

(58) Field of Classification Search
CPC ....... H04L 47/28; H04L 41/145; H04L 47/56; H04L 47/826; H04W 28/0247
USPC ........................................................ 370/235
See application file for complete search history.

(56) References Cited

U.S. PATENT DOCUMENTS

| | | | |
|---|---|---|---|
| 7,447,229 B2 * | 11/2008 | Regnier | H04L 47/18 370/414 |
| 9,935,865 B2 | 4/2018 | Ganesan et al. | |
| 2005/0058147 A1 * | 3/2005 | Regnier | H04L 47/245 370/412 |
| 2011/0225503 A1 * | 9/2011 | Slavin | H04L 67/10 715/740 |
| 2015/0081865 A1 * | 3/2015 | Kostic | H04L 49/505 709/223 |

(Continued)

FOREIGN PATENT DOCUMENTS

| | | | | |
|---|---|---|---|---|
| CN | 107370732 A | * | 11/2017 | ........... G06K 9/6228 |
| CN | 108696432 A | * | 10/2018 | ............. H04L 45/02 |

(Continued)

OTHER PUBLICATIONS

European Patent Office, Extended European Search Report, Application No. 23212570.8, Mar. 13, 2024, 20 pages.

*Primary Examiner* — Frantz Coby
(74) *Attorney, Agent, or Firm* — Quarles & Brady LLP (57) ABSTRACT

Systems and methods for accurate network traffic flow for time-sensitive networking in industrial systems. One configuration provides a system for controlling network traffic flow for time-sensitive networking in industrial systems. The system includes an electronic processor configured to receive, from an industrial controller of an industrial system, queuing data associated with a first queue of the industrial controller. The electronic processor is also configured to determine, based on the queuing data, a distribution of network traffic within the industrial system. The electronic processor is also configured to generate a network traffic model for display, the network traffic model including the distribution of network traffic within the industrial system.

20 Claims, 9 Drawing Sheets

(56) References Cited

U.S. PATENT DOCUMENTS

2024/0036535 A1* 2/2024 Telschig ............ G05B 19/4186

FOREIGN PATENT DOCUMENTS

| CN | 110048869 | A | | 7/2019 | | |
|----|-----------|----|---|---------|---|---|
| CN | 112003791 | A | | 11/2020 | | |
| CN | 117975713 | A | * | 5/2024 | .......... | H04W 72/044 |
| EP | 2042959 | A1 | * | 4/2009 | ......... | G05B 19/4185 |
| EP | 2042960 | A2 | * | 4/2009 | ............. | G05B 21/02 |
| EP | 2453613 | A1 | * | 5/2012 | ........ | H04L 47/6215 |
| EP | 2042960 | B1 | * | 6/2014 | ............. | G05B 21/02 |
| EP | 2042959 | B1 | * | 8/2018 | ......... | G05B 19/4185 |
| WO | WO-2019192683 | A1 | * | 10/2019 | .......... | H04W 72/566 |
| WO | WO-2021133259 | A1 | * | 7/2021 | ............. | H04L 45/02 |

* cited by examiner

NETWORK TRAFFIC FLOW CONTROL FOR TIME SENSITIVE NETWORKING

CROSS-REFERENCES TO RELATED APPLICATIONS

Not applicable.

BACKGROUND INFORMATION

In many cases, industrial networks are getting larger and more complex. The time sensitive networking ("TSN") industrial profile has been developed by the industry as a guideline to meet the demands of industrial devices (such as, e.g., IEC/IEEE 60802). This equipment has bandwidth and latency standards for providing reliable communications. These networks often carry different traffic classes. Therefore, predicting network performance is important for ensuring a deployed network will meet the needs for device traffic. Traffic loads are increasing as more and more devices are added to these networks, which further strains their capacity and determinism. Accordingly, there is a need for a more precise and accurate metric representing network traffic load.

Some conventional approaches attempt to estimate traffic load. However, an estimate of traffic load does not provide an accurate representation of a true traffic load experienced by an industrial network. Rather, an estimate of traffic load is a "one-size fits all" number that is used for rough calculations of networking traffic. Additionally, such estimates of traffic load tend to be overly pessimistic in order to guarantee time sensitive deadlines can be met in all situations.

Another technical problem includes the variety of different network topologies and various end-user (or customer) programs running on industrial devices are different, causing different traffic patterns. Therefore, a better metric with more accuracy is desirable.

Furthermore, with TSN scheduling (e.g., such as standardized through IEEE802.1Qbv-2015), more precise control or management of the fluctuating network load (which may be measured) is desired to maximize throughput without disrupting the stability of the queuing system. Often this static traffic specification ("TSPEC") measure is overly conservative to cover worst case scenarios; and, hence, resulting network efficiency can suffer due to wasted bandwidth caused by excessive guard banding.

For applications such as motion, where quality of service is a high priority consideration to system performance, an internally developed proprietary tool, such as a system performance estimator, may be implemented to model multiple motion axes of network traffic in addition to input/output ("I/O") data and produce/consume data. This gives a better bandwidth model of a network without detailed component information. However, this cannot be used for estimation of network delay, latency, and jitter.

Accordingly, there is a need for added functionality and accuracy to such calculations, which is more suitable for TSN systems as well as non-TSN systems. Additionally, there is a need to help validate how well a model fits actual devices implemented within an industrial system.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to accurate network traffic flow for TSN in industrial systems. Configurations described herein may check the accuracy of a tool doing the calculation in practice, such that mid-stream adjustments to be made based on real-world conditions. Alternatively, or in addition, configurations may enable performance of rapid diagnostic estimations such that fine grain adjustments may be implemented (in real-time or near real-time) such that the network performance aligns with design standards or metrics. Alternatively, or in addition, configurations described herein may enable improved model generation as opposed to having to overprovision the network to ensure deadlines are satisfied.

Accordingly, the configurations disclosed herein may provide a light weight firmware diagnostic based on Little's Formula, which runs in the background on an industrial device (e.g., a programmable logic controller ("PLC"). In some configurations, this lightweight software may execute occasionally and can provide enhanced accuracy with a high degree of accuracy (since the numbers are not estimates but rather derived from actual network data), as well as the potential for "live" run-time adjustments to industrial devices deployed in an industrial network already running in the field.

For instance, in some configurations, timestamps for transmit/receive ("Tx/Rx") may be created by an Ethernet MAC hardware automatically and are, in some implementations, already examined on each frame descriptor as part of the data packet processing. Hence, an accurate average waiting time can be kept up to date (e.g., at all times or constantly during runtime) by simply having firmware update the average time calculation on each frame and subtracting from the current controller time. For transmit, a reading of current time can be subtracted from when the data packet is actually transmitted (at which point the MAC hardware updates the TX time descriptor). In some configurations, RX timestamps may be updated automatically as the frame enters the MAC hardware and can be subtracted from the current time when firmware dequeues the packet. Such hardware assisted methods allow for the software diagnostic to easily obtain a very accurate measure of packet arrival and/or departure's seen in the network. Thus, waiting times seen in the queue may be accurately obtained with simple software operations.

In some configurations, an industrial system may include one or more intermediate or end industrial devices connected to a non-TSN industrial device providing the functionality described herein, which are legacy devices. Such legacy devices may not implement the functionality described herein. Although such legacy devices may not implement the functionality described herein, the technology disclosed herein may still monitor the contribution of the one or more legacy devices to the network traffic by looking at queues of other devices with the functionality described herein, which may be communicating with the legacy components or devices. For instance, by controlling (or adjusting) network parameters of participating industrial devices (e.g., industrial devices implementing the functionality described herein), the traffic of such legacy non-forming devices may be indirectly controlled (e.g., receive traffic shaping of TSN industrial devices) and accurately modeled.

Accordingly, configurations described herein provide systems and methods for accurate network traffic flow for TSN. One configuration provides a system for controlling network traffic flow for time-sensitive networking in industrial systems. The system includes an electronic processor configured to receive, from an industrial controller of an industrial system, queuing data associated with a first queue of the industrial controller. The electronic processor is also configured to determine, based on the queuing data, a distribution of network traffic within the industrial system. The electronic processor is also configured to generate a network traffic model for display, the network traffic model including the distribution of network traffic within the industrial system.

Another configuration provides a method for accurate network traffic flow for TSN in industrial systems. The method includes receiving, from an industrial controller of an industrial system, a first set of queue data associated with a first queue of the industrial controller. The method also includes receiving, from the industrial controller of the industrial system, a second set of queue data associated with a second queue of the industrial controller. The method also includes determining, with an electronic processor, a distribution of network traffic for the industrial system based on the first set of queue data and the second set of queue data. The method also includes generating, with the electronic processor, a network traffic flow model for the industrial system indicating the distribution of network traffic for the industrial system.

Yet another configuration provides a non-transitory computer-readable medium storing instructions that, when executed by an electronic processor, perform a set of functions. The set of functions include receiving first queuing data associated with a first queue, the first queuing data including a first queue depth of data packets in the first queue and a first set of hardware timestamps associated with data packets in the first queue. The set of functions also includes receiving second queuing data associated with a second queue, the second queuing data including a second queue depth of data packets in the second queue and a second set of hardware timestamps associated with data packets in the second queue. The set of functions also includes determining, based on the first queuing data, a first average arrival time for data packets at the first queue. The set of functions also includes determining, based on the second queuing data, a second average arrival time for data packets at the second queue. The set of functions also includes determining, based on the first average arrival time and the second average arrival time, a distribution of network traffic for an industrial system associated with the first queue and the second queue. The set of functions also includes generating and transmitting a network traffic model based on the distribution of the network traffic for the industrial system to a display device for display to a user.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

As utilized herein, terms "component," "system," "controller," "device," "manager," "computer module," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

Figure 1:
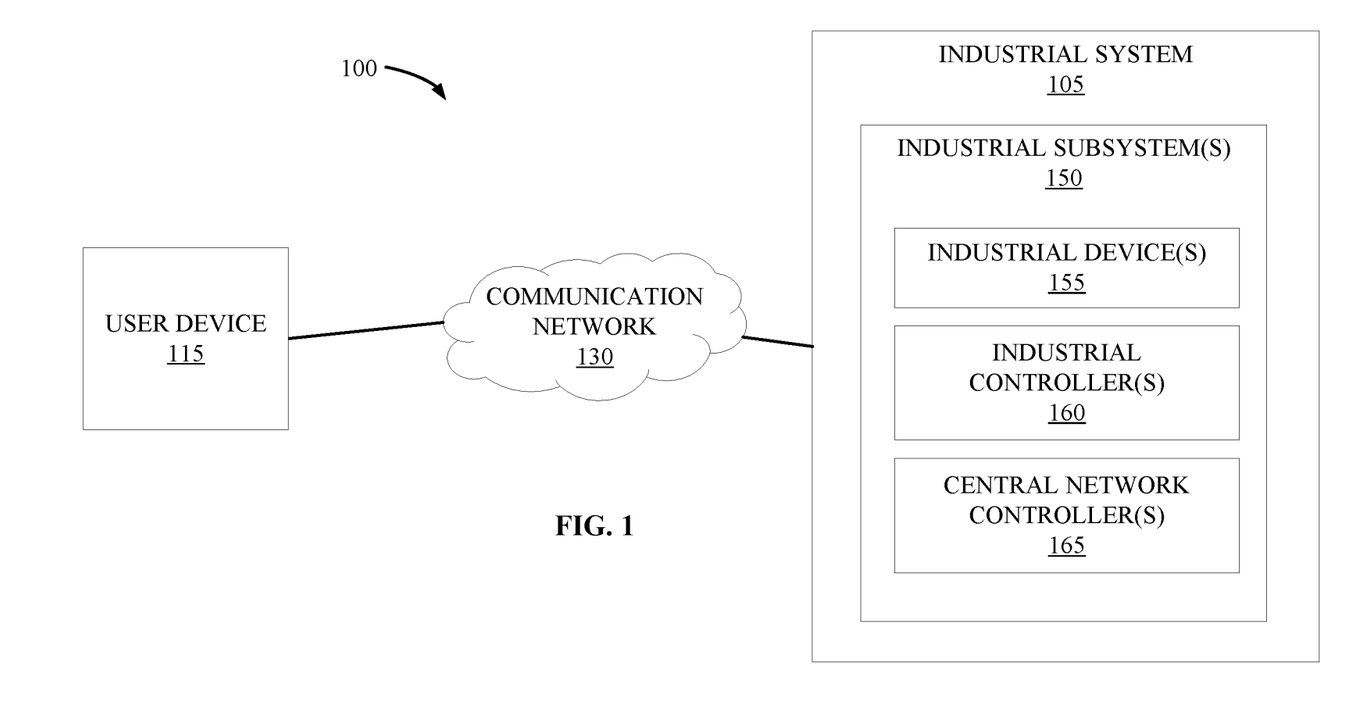
FIG. 1 schematically illustrates a system for providing accurate network traffic flow for TSN according to some configurations.

FIG. 1 schematically illustrates a system 100 for providing accurate network traffic flow for TSN according to some configurations. In the illustrated example, the system 100 may include an industrial system 105 and a user device 115. In some configurations, the system 100 includes fewer, additional, or different components in different configurations than illustrated in FIG. 1. As one non-limiting example, the system 100 may include multiple industrial systems 105, multiple user devices 115, or a combination thereof. As another non-limiting example, one or more components of the system 100 may be combined into a single device. Alternatively, or in addition, in some configurations, the user device 115 may be included as part of the industrial system 105 (e.g., as a component of the industrial system 105).

The industrial system 105 and the user device 115 may communicate over one or more communication networks 130. The one or more communication networks 130 may include a wired communication network, a wireless communication network, or a combination thereof. Portions of the communication networks 130 may be implemented using a wide area network, such as the Internet, a local area network, such as a WI-FI®, and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may perform one or more industrial processes, manufacturing processes, production processes, or the like. In some embodiments, the industrial system 105 may perform a production method that produces goods or products. As one non-limiting example, the industrial system 105 may perform a vehicle manufacturing process to assemble or produce a vehicle (or various components thereof). As another non-limiting example, the industrial system 105 may perform a food manufacturing process for making a food product.

As illustrated in FIG. 1, in some configurations, the industrial system 105 may include at least one industrial subsystem 150 (referred to herein collectively as "the industrial subsystems 150" and individually as "the industrial subsystem 150"). Although FIG. 1 illustrates a single industrial subsystem 150, in some configurations, the industrial system 105 may include more than one industrial subsystem 150 (e.g., a second industrial subsystem, a third industrial subsystem, a fourth industrial subsystem, and an Nth industrial subsystem). The industrial subsystem 150 may represent a section of the industrial system 105, such as, e.g., a workstation, a piece of equipment or machinery, a segment of the industrial system 105, or another component of the industrial system 105. The industrial subsystem 150 may perform (or be associated with) one or more sub-processes of the industrial system 105. As one non-limiting example, when the industrial system 105 performs a vehicle manufacturing process, the industrial subsystem 150 may perform an installation process for windshields.

In the illustrated example, the industrial subsystem 150 may include one or more industrial devices 155 (referred to herein collectively as "the industrial devices 155" and individually as "the industrial device 155"), one or more industrial controllers 160 (referred to herein collectively as "the industrial controllers 160" and individually as "the industrial controller 160"), and one or more central network controllers ("CNCs") 165 (referred to herein collectively as "the CNCs 165" and individually as "the CNC 165"). In some configurations, the industrial subsystem 150 includes fewer, additional, or different components in different configurations than illustrated in FIG. 1. As one non-limiting example, the CNC 165 may be associated with multiple industrial subsystems 150 (e.g., a first industrial subsystem, a second industrial subsystem, etc.) of the industrial system 105 (as opposed to, e.g., a dedicated CNC 165 for each industrial subsystem 150 of the industrial system 105).

The industrial device 155 may be a physical piece of equipment included in the industrial subsystem 150. For example, the industrial device 155 may include a pump, a press, a conveyor, an actuator, a valve, an additional industrial controller (e.g., a programmable logic controller ("PLC"), industrial compute module, network switch, and the like), a switch, a sensor, a server, a database, an additional HMI, another piece of equipment that may be used in connection with an associated industrial process (or subprocess) or application of the industrial system 105, or the like.

Figure 2:
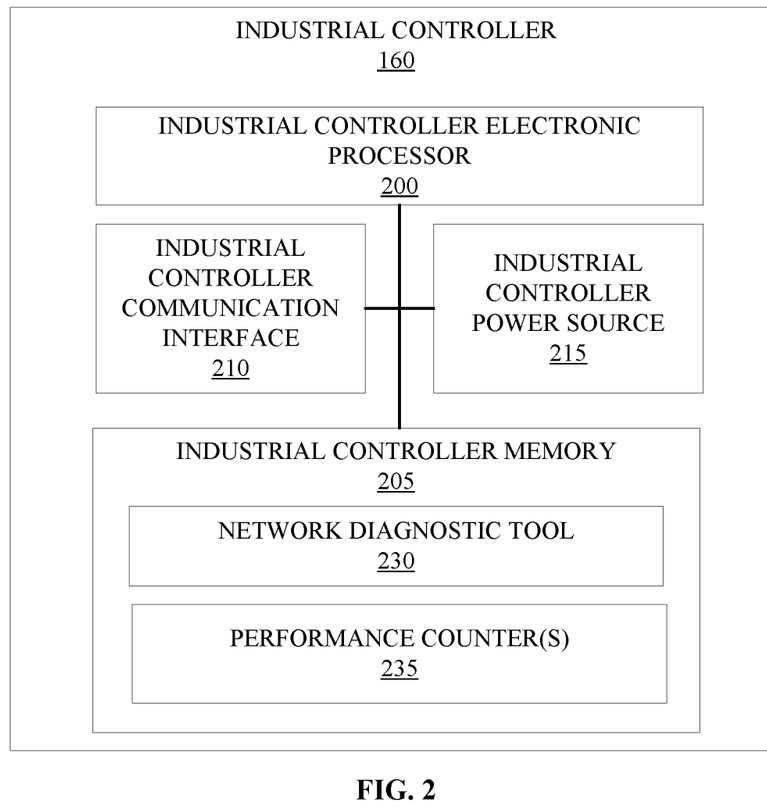
FIG. 2 schematically illustrates an industrial controller of the system of FIG. 1 according to some configurations.

The industrial controller 160 may include a programmable logic controller ("PLC"), another type of industrial controller, or the like. FIG. 2 illustrates an example industrial controller 160 according to some configurations. In the illustrated example of FIG. 2, the industrial controller 160 includes an industrial controller electronic processor 200, an industrial controller memory 205, an industrial controller communication interface 210, and an industrial controller power source 215. The industrial controller electronic processor 200, the industrial controller memory 205, the industrial controller communication interface 210, and the industrial controller power source 215 communicate over one or more communication lines or buses. The industrial controller 160 may include additional, fewer, or different components than those illustrated in FIG. 2 in various configurations. The industrial controller 160 may also perform additional functionality other than the functionality described herein.

In some embodiments, the industrial controller communication interface 210 enables the industrial controller 160 to communicate with the user device 115, one or more of the industrial devices 155, one or more of the central network controllers 165, or a combination thereof over one or more wired or wireless communication connections. The industrial controller electronic processor 200 includes a microprocessor, an application-specific integrated circuit ("ASIC"), a system-on-chip ("SOC"), a system-on-module ("SOM"), a field-programable gate array ("FPGA"), or another suitable electronic device for processing data, and the industrial controller memory 205 includes a non-transitory, computer-readable storage medium, including, e.g., hardware engines with direct memory access ("DMA"). The industrial controller electronic processor 200 is configured to retrieve instructions and data from the industrial controller memory 205 and execute the instructions.

As one non-limiting example, as illustrated in FIG. 2, the industrial controller memory 205 includes a network diagnostic tool 230. The network diagnostic tool 230 is a software application executable by the industrial controller electronic processor 200 in the example illustrated and as specifically discussed below, although a similarly purposed module can be implemented in other ways in other examples. In some configurations, the network diagnostic tool 230 is firmware, such as, e.g., a lightweight diagnostic firmware. In such configurations, the network diagnostic tool 230 may be firmware running in the background of the industrial controller 160. The industrial controller electronic processor 200 may execute the network diagnostic tool 230 to facilitate accurate network traffic flow for TSN, and more specifically, to facilitate the generation of a network traffic model describing network traffic flow for the industrial system 105 (or one or more subsystems 150 therein), the control of network traffic flow to optimize network traffic flow by modifying a queue parameter (e.g., on/off timing of a queue to implement a desired traffic schedule for that particular class of service carried in that queue), or the like.

As also illustrated in FIG. 2, in some configurations, the industrial controller memory 205 includes one or more performance counters 235 (referred to herein collectively as "the performance counters 235" and individually as "the performance counter 235). The performance counter 235 may be a register (such as a special-purpose register) that stores count data of hardware-related activities of the industrial controller 160 (e.g., the industrial controller communication interface 210). As one non-limiting example, the performance counter 235 may store count data associated with each queue of the industrial controller 160, such as, e.g., a count of how many data packets are in each queue.

Alternatively, or in addition, in some configuration, it should be appreciated that network medium access controller ("MAC") devices may employ hardware DMA engines. In such configurations, software may interact with hardware transfers using a data structure (e.g., commonly referred to as a descriptor with hardware/software ownership bit). As frames arrive from the hardware, queue size increments as a new frame descriptor is written by DMA. A hardware counter automatically increments for that particular queue. As software processes each received frame from that particular queue, queue size decrements (the hardware counter automatically decrements each time software processes a receive frame from that queue). The transfer of the ownership bit signals the hardware counter to decrement in this case. The situation on transmit is reversed but may be analogous. Different counters like this can exist for each queue descriptor set. Hence, software may readily access an "at a glance view" of the queue sizes of a plethora of Tx/Rx queues by, e.g., reading each hardware generated queue size counter.

The CNC 165 may function as a network interface between components internal to the industrial system 105 (or an industrial subsystem 150 therein) and components external to the industrial system 105 (or an industrial subsystem 150 therein). As one non-limiting example, the CNC 165 may function as a gateway or network interface between the user device 115 and one or more components of the industrial system 105.

Figure 3:
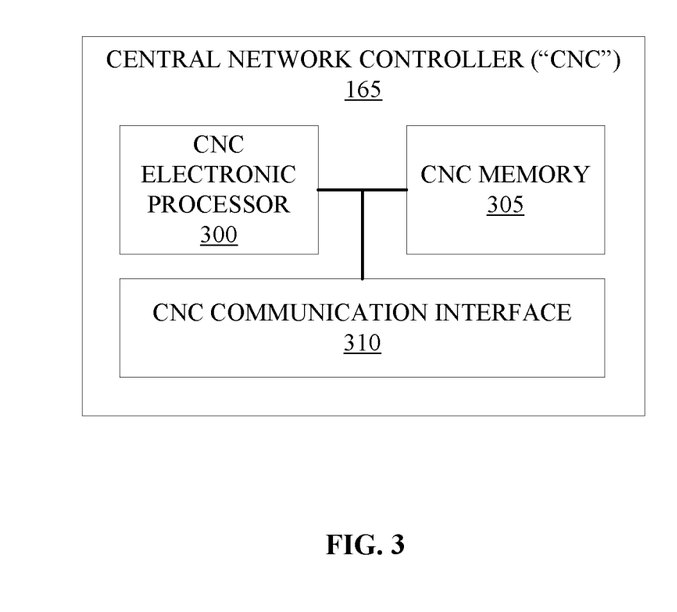
FIG. 3 schematically illustrates an example central network controller of the system of FIG. 1 according to some configurations.

FIG. 3 illustrates an example CNC 165 according to some configurations. In the illustrated example of FIG. 3, the CNC 165 includes a CNC electronic processor, a CNC memory 305, and a CNC communication interface 310. The CNC electronic processor, the CNC memory 305, and the CNC communication interface 310 communicate over one or more communication lines or buses. The CNC 165 may include additional, fewer, or different components than those illustrated in FIG. 3 in various configurations. The CNC 165 may also perform additional functionality other than the functionality described herein.

In some embodiments, the CNC communication interface 310 enables the CNC 165 to communicate with the user device 115, one or more of the industrial devices 155, one or more of the industrial controllers 160, or a combination thereof over one or more wired or wireless communication connections. The CNC electronic processor 300 includes a microprocessor, an ASIC, or another suitable electronic device for processing data, and the CNC memory 305 includes a non-transitory, computer-readable storage medium. The CNC electronic processor 300 is configured to retrieve instructions and data from the CNC memory 305 and execute the instructions.

Figure 4:
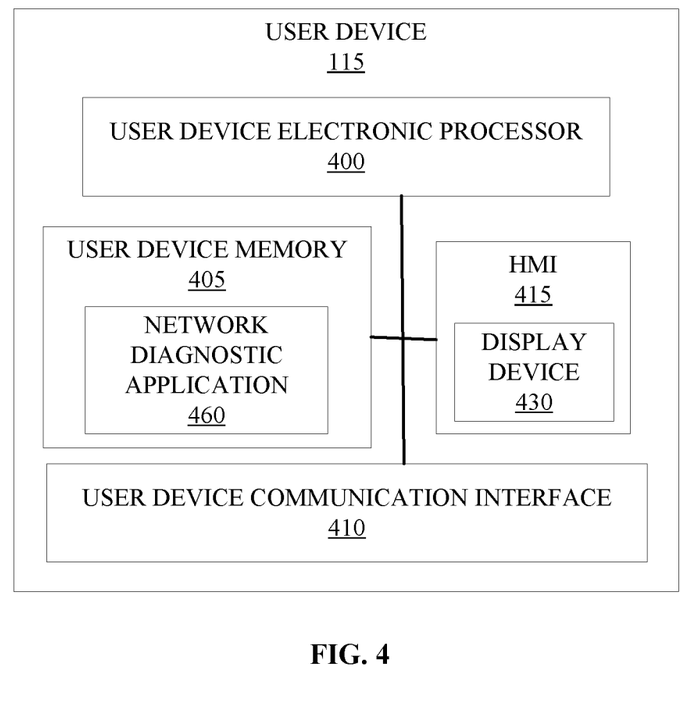
FIG. 4 schematically illustrates an example user device of the system of FIG. 1 according to some configurations.

The user device 115 may be a computing device, such as a desktop computer, a laptop computer, a tablet computer, a terminal, a smart telephone, a smart television, a smart wearable, or another suitable computing device that interfaces with a user. As illustrated in FIG. 4, the user device 115 includes a user device electronic processor 400, a user device memory 405, a user device communication interface 410, and a human-machine interface ("HMI") 415. The user device electronic processor 400, the user device memory 405, the user device communication interface 410, and the HMI 415 communicate wirelessly, over one or more communication lines or buses, or a combination thereof. The user device 115 may include additional components than those illustrated in FIG. 4 in various configurations. The user device 115 may also perform additional functionality other than the functionality described herein. Also, the functionality described herein as being performed by the user device 115 may be distributed among multiple devices (e.g., as part of a cloud service or cloud-computing environment), combined with another component of the system 100, or a combination thereof.

The user device communication interface 410 may include a transceiver that communicates with the industrial system 105 over the communication network 130 and, optionally, one or more other communication networks or connections. The user device electronic processor 400 includes a microprocessor, ASIC, SOC, SOM, FPGA, or another suitable electronic device for processing data, and the user device memory 405 includes a non-transitory, computer-readable storage medium. The user device electronic processor 400 is configured to retrieve instructions and data from the user device memory 405 and execute the instructions.

As one non-limiting example, as illustrated in FIG. 4, the user device memory 405 includes a network diagnostic application 460 (referred to herein as "the application 460"). The application 460 is a software application executable by the user device electronic processor 400 in the example illustrated and as specifically discussed below, although a similarly purposed module can be implemented in other ways in other examples. The user device electronic processor 400 executes the application 460 to facilitate accurate network traffic flow for TSN, and more specifically, to facilitate the generation of a network traffic model describing network traffic flow for the industrial system 105 (or one or more subsystems 150 therein), the control of network traffic flow to optimize network traffic flow by modifying a queue parameter (e.g., on/off timing of a queue depending on a desired schedule (e.g., timesharing) amongst all queues), or the like.

As described in greater detail herein, in some configurations, the user device electronic processor 400 may execute the application 460 to generate a user interface (e.g., a graphical user interface ("GUI")) that includes network information associated with the industrial system 105. For instance, in some configurations, the user interface may include a graphical representation of the network traffic model, a network traffic report, a histogram or other graphical representation of network traffic flow (e.g., a traffic delay diagram), etc. As one non-limiting example, the user interface may include a representation describing each queue status of a particular device, an aggregate depiction of all queues of a particular device, or the like. In some configurations, the user interface is a real-time (or near real-time) interface showing real-time network traffic flow data, alerts or alarms associated with the network traffic flow, etc.

In some configurations, the functionality (or a portion thereof) described herein as being performed by the user device 115 may be distributed among multiple devices (e.g., as part of a cloud service or cloud-computing environment). As one non-limiting example, in some embodiments, the system 100 includes a server (e.g., a computing device). The server may include similar components as the user device 115, such as an electronic processor (e.g., a microprocessor, an ASIC, or another suitable electronic device), a memory (e.g., a non-transitory, computer-readable storage medium), a communication interface, such as a transceiver, for communicating over the communication network 130 and, optionally, one or more additional communication networks or connections. Accordingly, in some embodiments, the server may store the application 460 as part of providing a programming service through the server. In such embodiments, to communicate with the server (e.g., interact with the application 460), the user device 115 may store a browser application or a dedicated software application executable by the user device electronic processor 400.

Figure 5:
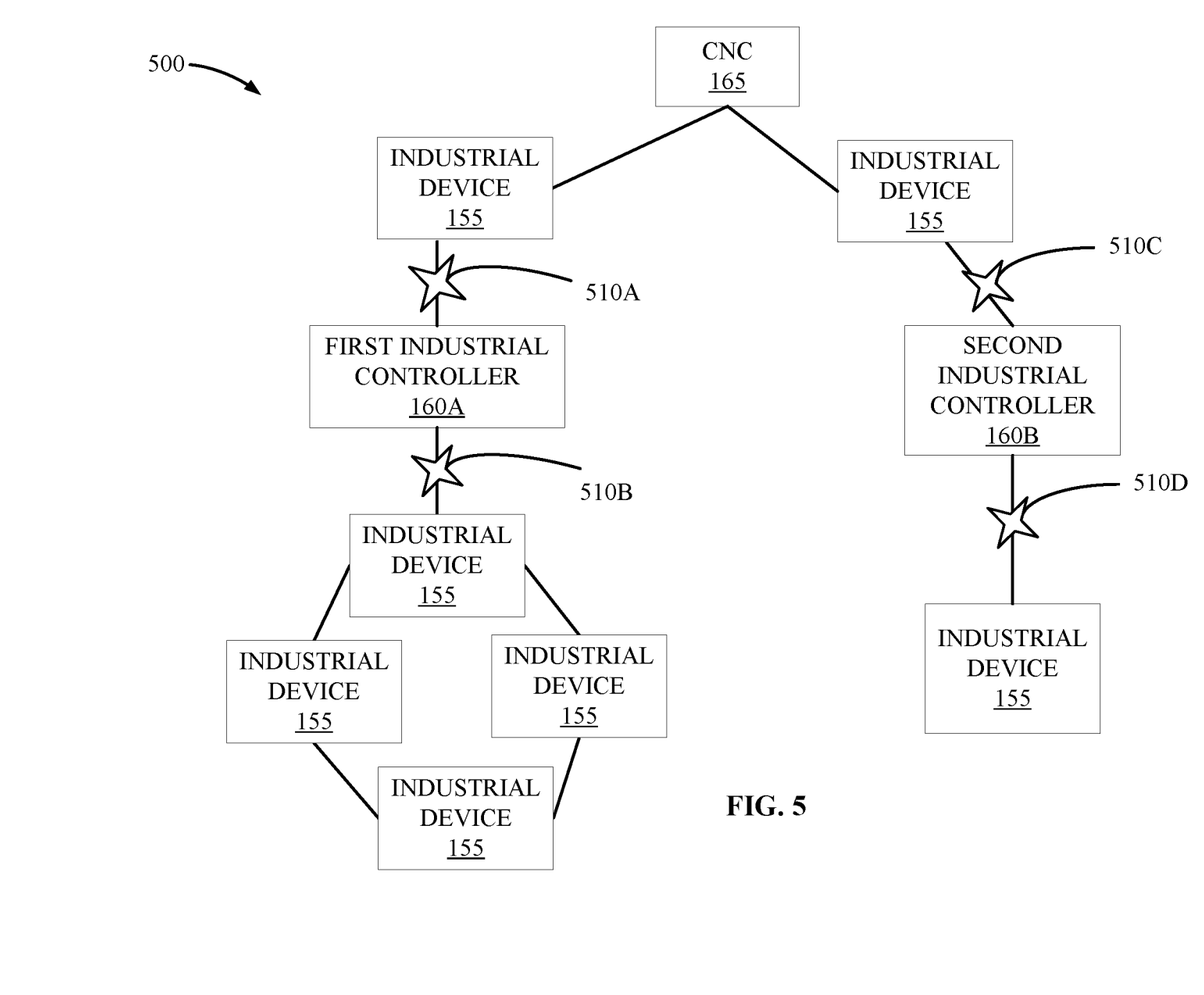
FIG. 5 schematically illustrates an example network topology of an industrial system according to some configurations.

FIG. 5 illustrates an example network topology 500 of the industrial system 105 according to some configurations. In the illustrated example, the network topology 500 includes a plurality of nodes. Each node may represent (or include) a networked component included in the industrial system 105, including the CNC 165, one or more of the industrial controllers 160, one or more of the industrial devices 155, or a combination thereof (e.g., including components embedded into end or intermediate network switches themselves). In the illustrated example of FIG. 5, the network topology 500 includes the CNC 165, two industrial controllers 160 (represented in FIG. 5 as a first industrial controller 160A and a second industrial controller 160B), and a plurality of industrial devices 155. As described in greater detail herein, the placement of the industrial controller(s) 160 within the industrial system 105 enables various measurement (or diagnostic) points in which queuing data may be collected (via the industrial controller(s) 160). As also illustrated in FIG. 5, each industrial controller 160A, 160B is associated with a different subsystem of the industrial system 105 (represented in FIG. 5 as a left branch of the network topology 500 and a right branch of the network topology 500). As illustrated in FIG. 5, the first industrial controller 160A and the second industrial controller 160B are positioned within the industrial system 105 such that there are four measurement points (represented in FIG. 5 as a first measurement point 510A, a second measurement point 510B, a third measurement point 510C, and a fourth measurement point 510D).

Figure 6:
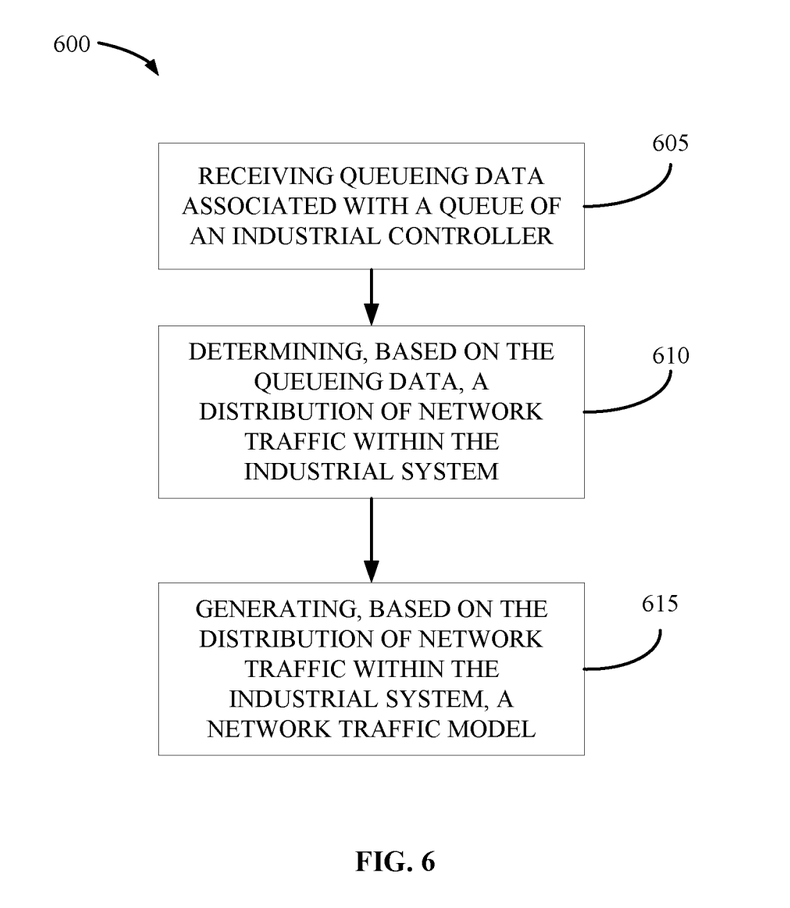
FIG. 6 is a flowchart illustrating a method for providing accurate network traffic flow for TSN using the system of FIG. 1 in accordance with some configurations.

FIG. 6 is a flowchart illustrating a method 600 for providing accurate network traffic flow for TSN according to some configurations. The method 600 is described herein as being performed by the CNC 165 (e.g., the CNC electronic processor 300). However, as noted herein, the functionality (or a portion thereof) described as being performed by the CNC 165 may be distributed among, and hence performed by, one or more other devices (e.g., the industrial controller(s) 160).

As illustrated in FIG. 6, the method 600 includes receiving, with the CNC electronic processor 300, queuing data associated with a queue of the industrial controller (at block 605). The queuing data may include data describing a queue of the industrial controller 160, a set of data packets included in the queue of the industrial controller 160, or the like. The queuing data may include a set of timestamps associated with data packets in the queue (e.g., arrival times, departure times, etc.). In some configurations, the set of timestamps are hardware timestamps for frames within the queue. Alternatively, or in addition, the queuing data may include a number of data packets included in the queue (e.g., as queue depth data).

The CNC electronic processor 300 may receive the queuing data from one or more queues associated with at least one of the industrial controllers 160. As one non-limiting example, the queuing data may include queuing data from a first queue, a second queue, and the like. In some configurations, the first queue may be included in a first industrial controller 160 and the second queue may be included in a second different industrial controller 160. Alternatively, or in addition, in some configurations, the first queue may be included in the first industrial controller and the second queue may be included in the first industrial controller. Accordingly, in some configurations, queues may be associated with (or included in) the same industrial controllers 160, different industrial controllers 160, or some combination thereof.

In some configurations, the CNC electronic processor 300 may receive the queuing data (e.g., queue size and waiting time for each queue) continuously in real-time (or near real-time) from the industrial controller 160. For instance, in some configurations, the industrial controller 160 may transmit "live" queuing data to the CNC electronic processor 300 during operation of the industrial system 105. Accordingly, in some configurations, the queuing data may be a dynamic data stream of queuing data being received from the industrial controller(s) 160.

Alternatively, or in addition, in some configurations, the CNC electronic processor 300 may receive the queuing data intermittently (or periodically), such as, e.g., according to a predetermined schedule. The predetermined schedule may be a time schedule (e.g., every two minutes), an event or task schedule (e.g., upon completion of an industrial system task), a threshold schedule (e.g., a queue size or depth threshold), or the like. For instance, in some configurations, the industrial controller 160 may transmit the queuing data in response to a predetermined schedule. As one non-limiting example, the industrial controller 160 may include a queue depth threshold that functions as a trigger (e.g., a network alarm) to transmit the queuing data to the CNC electronic processor 300. The queue depth threshold may define a threshold number of data packets within the queue, such as, e.g., a maximum number of data packets. In such configurations, the industrial controller 160 may transmit the queuing data when the queue depth threshold is satisfied. As one non-limiting example, when the queue depth threshold is five data packets, the industrial controller 160 may transmit the queuing data in response to detecting five data packets in the queue. Commonly such alarm thresholds can be set at a level before the network experiences problems meeting deadlines. This can be done to give the CNC 165 adequate time to adjust network parameters for one or more involved network devices before traffic deadlines are actually missed and connections drop.

The CNC electronic processor 300 may determine, based on the queuing data, a distribution of network traffic within the industrial system 105 (at block 610). A distribution of network traffic within the industrial system 105 may represent how traffic (e.g., data packets) are flowing through or between networked components of the industrial system 105. For instance, the distribution of network traffic may indicate congestion in the industrial system 105. As noted above, in some configurations, the queuing data is representative of live network traffic for the industrial system 105. In such configurations, the distribution of network traffic may represent a live (or current) distribution of network traffic (e.g., how data packets are currently flowing through or between networked components of the industrial system 105). For instance, in some configurations, the distribution of network traffic within the industrial system 105 represents an average arrival rate of data packets at the industrial controller 160 (or a queue thereof).

In some configurations, the CNC electronic processor 300 determines the distribution of network traffic within the industrial system 105 by determining an average queue depth for data packets of the queue and determining an average wait time for the data packets of the queue. The CNC electronic processor 300 may then determine the distribution of network traffic based on the average queue depth and the average wait time. It should be appreciated that such influence of this distribution by the CNC 165 may involve the adjustment of one or more devices in the network, not necessarily just the device being currently examined by the CNC 165.

In some configurations, the CNC electronic processor 300 determines the distribution of network traffic as a long-term average arrival/departure distribution of the industrial system 105 (e.g., for transmit and receive directions). Accordingly, in some configurations, the CNC electronic processor 300 may monitor the arrival and departure rates (with respect to a set of queues of one or more industrial controllers 160) of an industrial network system (e.g., the industrial system 105). The steady state arrival and departure average traffic distribution of a network (e.g., the industrial system 105) may impact transmit scheduling and receive shaping established by the industrial profile for TSN.

In some configurations, the CNC electronic processor 300 may implement Little's Formula represented below:

$$L = \lambda \times W$$

where $\lambda$ is the average arrival rate seen to/from each particular network queue of a device, or collection of devices (e.g., the industrial controller 160), L is the average number of data packets in each queue of the device (e.g., an average queue depth per queue), and W is the average time data packets stay in each queue of the device (e.g., an average wait time per queue). In some configurations, the average queue depth may be determined (or obtained) from one or more hardware queue counters. In some configurations, the average wait time may be determined (or obtained) by averaging data packet timestamps. It should be appreciated that these concepts extend both to Tx and Rx traffic of one or more queues of a device or collection of devices.

Accordingly, the CNC electronic processor 300 may determine the distribution of network traffic as a long-term average trend for determining the stability of a queuing system. A stable system has arrival rates and departure rates ($\lambda$) that match. Otherwise, the queuing system is unstable (e.g., ingress overflow or egress underflow). Additionally, in some configurations, one or more hardware queue counters may contain a MAX value for each queue. In such configurations, the CNC electronic processor 300 may determine a standard deviation associated with the distribution of network traffic.

The CNC electronic processor 300 may generate a network traffic model (at block 615). The network traffic model may indicate or represent the distribution of network traffic within the industrial system 105. In some configurations, the network traffic model may include a network topology for the industrial system 105. In such configurations, the network topology may include an indication of (or otherwise provide) the distribution of network traffic within the industrial system 105 (e.g., the entire industrial system 105).

In some configurations, the industrial system 105 may include one or more intermediate or end industrial devices connected to a non-TSN industrial device providing the functionality described herein, which are legacy devices. Such legacy devices may not implement the functionality described herein. Although such legacy devices may not implement the functionality described herein, the technology disclosed herein may still monitor the contribution of the one or more legacy devices to the network traffic by looking at queues of other devices with the functionality described herein, which may be communicating with the legacy components or devices. For instance, by controlling (or adjusting) network parameters of participating industrial devices (e.g., industrial devices implementing the functionality described herein), the traffic of such legacy non-forming devices may be indirectly controlled (e.g., receive traffic shaping of TSN industrial devices) and accurately modeled.

In some configurations, the CNC electronic processor 300 transmits (or otherwise provides) the network traffic model to a remote device for display to a user, such as, e.g., the user device 115. In response to receiving the network traffic model, the user device 115 (via the user device electronic processor 400 executing the application 460) may generate a user interface (e.g., GUI) including network information associated with the industrial system 105. For instance, in some configurations, the user interface may include a graphical representation of the network traffic model, a network traffic report, a histogram or other graphical representation of network traffic flow (e.g., a traffic delay diagram), etc. In some configurations, the user interface is a real-time (or near real-time) interface showing real-time network traffic flow data, alerts or alarms associated with the network traffic flow, etc. The user interface (e.g., GUI) may be displayed (or otherwise provided to) a user of the user device 115 via, e.g., the HMI 415, such as the display device 430. A user may then interact with the user interface (e.g., GUI) using the HMI 415 of the user device 115. As one non-limiting example, the user may interact with the user interface by accessing and viewing the network information associated with the industrial system 105 (e.g., as a real-time interface indicating network traffic flow for the industrial system 105 during operation of the industrial system 105).

Figure 7:
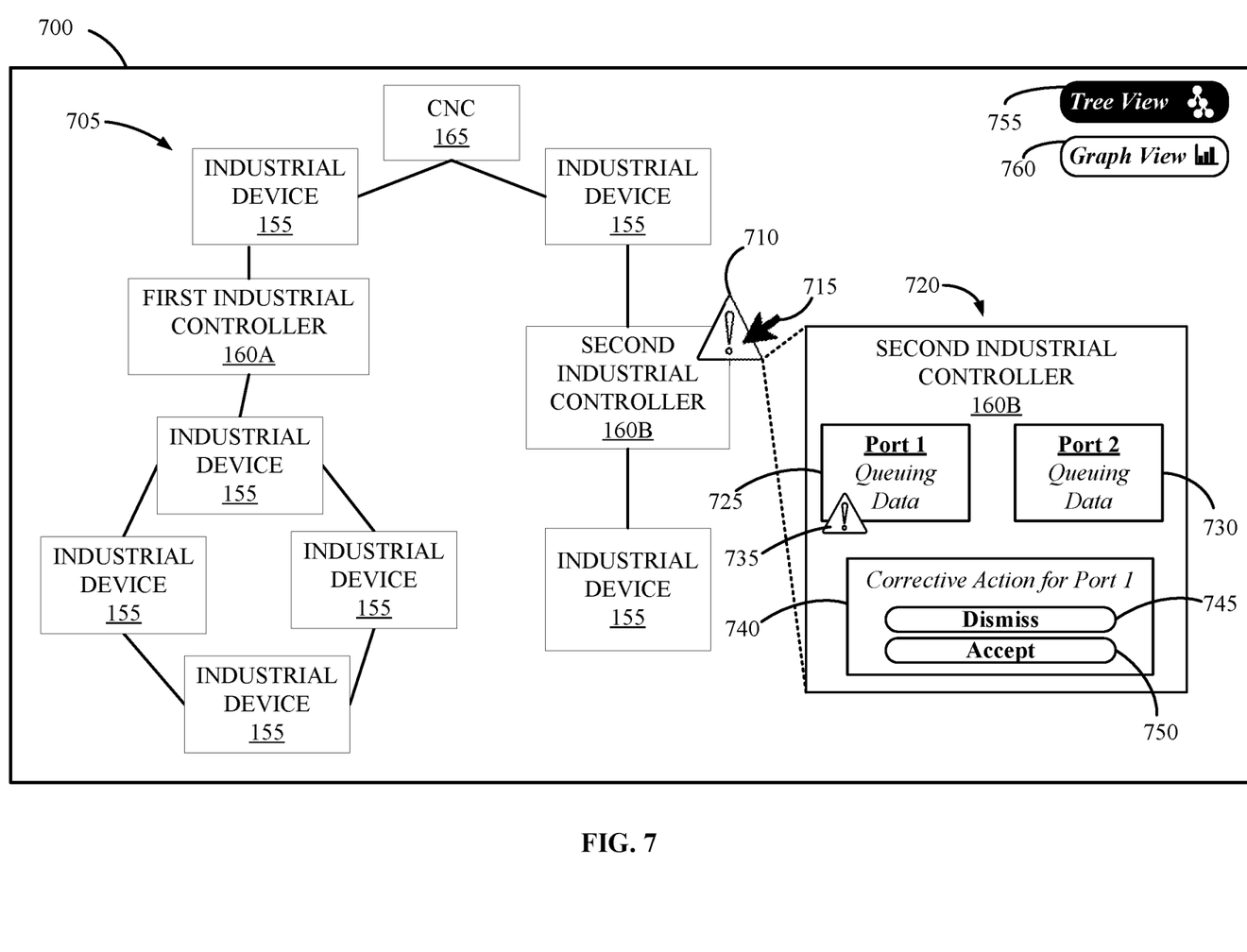
FIG. 7 illustrates an example user interface indicating distribution of network traffic for an industrial system according to some configurations.

FIG. 7 illustrates an example user interface 700 indicating a distribution of network traffic for the industrial system 105 according to some configurations. In the illustrated example of FIG. 7, the user interface 700 includes a graphical representation 705 of the network topology 500 of FIG. 5. The graphical representation 705 includes a warning indicator 710 associated with the second industrial controller 160B. The warning indicator 710 may indicate an error or alert associated with the distribution of network traffic for the industrial system 105. A user may interact with the warning indicator 710 to view additional information associated with the warning indicator 710 (represented in FIG. 7 by the cursor 715). In response to a user interacting with the warning indicator 710, the user may view additional information associated with the warning indicator 710 via a summary dialogue box 720. The summary dialogue box 720 may provide a listing of ports associated with the second industrial controller (e.g., Port 1 represented by reference numeral 725 and Port 2 represented by reference numeral 730). The summary dialogue box 720 may also include information associated with each port, including, e.g., queuing data, including queue depth or size, performance metrics, etc. The summary dialogue box 720 may also indicate which port is associated with a warning via a warning indicator 735.

In some configurations, the summary dialogue box 720 may also provide a suggested corrective action for the port(s) associated with a warning (e.g., Port 1 of FIG. 7). A corrective action may include, e.g., an adjustment to one or more queuing parameters, such as a timing parameter. In some configurations, the corrective action is an adjustment to a queuing parameter for the component or device associated with the error. Alternatively, or in addition, the corrective action may be an adjustment to a queuing parameter for a different component or device included in the industrial system 105 (e.g., for controlling queue parameters of adjacent devices, upstream devices, downstream devices, or the like). As illustrated in the example of FIG. 7, the suggested corrective action may be provided via a corrective action dialogue box 740. The corrective action dialogue box 740 may provide one or more suggested corrective actions (e.g., including a description of each suggested corrective action, an estimated remedial effect of the suggested corrective action, etc.). In some configurations, the corrective action dialogue box 740 may provide a "dismiss" button 745 for declining a corrective action and an "accept" button 750 for accepting a corrective action.

In some configurations, the user interface 700 includes additional, different, or fewer information or graphical representations than included in the example of FIG. 7. For instance, in some configurations, the user interface 700 may include a graphical representation of the distribution of network traffic for the industrial system 105. As one non-limiting example, as illustrated in FIG. 7, the user interface 700 may include buttons that a user may interact with to select how information is presented to the user via the user interface 700. For instance, as illustrated in FIG. 7, the user interface 700 includes a tree view button 755 and a graph view button 760. When a user interacts with (or selects) the tree view button 755, the user interface 700 may present information in via network topology tree view, as illustrated in FIG. 7. When a user interacts with (or selects) the graph view button 760, the user interface 700 may present information as graphical representations, e.g., including one or more bar graphs, pie charts, histograms, etc. Alternatively, or in addition, in some configurations the user interface 700 may present information via a network topology tree and one or more graphical representations simultaneously.

Alternatively, or in addition, in some configurations, the CNC electronic processor 300 may generate one or more control signals for controlling (or adjusting) the distribution of network traffic for the industrial system 105, such that, e.g., network traffic for the industrial system 105 may be optimized by reducing congestion, balancing bandwidth among a set of queues, etc. As one non-limiting example, a control signal may include an adjustment to a timing parameter or another servicing parameter associated with the industrial controller 160.

The CNC electronic processor 300 may control the distribution of network traffic for the industrial system 105 in order to keep queues stable (e.g., both transmit queues and receive queues). Using this diagnostic along with TSN allows the potential to tune network traffic parameters to suit the needs of different customer applications, network deployments, and the like. Additionally, the configurations disclosed herein may facilitate real-time (or near real-time) refinement for accurate network calculus models. Accordingly, the configurations described herein enable an end-user (or customer) to determine how stable (or unstable) an overall network estimated model is with respect to that end-user's true running of the industrial system 105.

Accordingly, in some configurations, the CNC electronic processor 300, based at least in part on the distribution of network traffic, may generate a control signal for the industrial controller 160 and transmit the control signal to the industrial controller 160 such that the industrial controller 160 is controlled according to the control signal and adjusts the distribution of network traffic.

Figure 8:
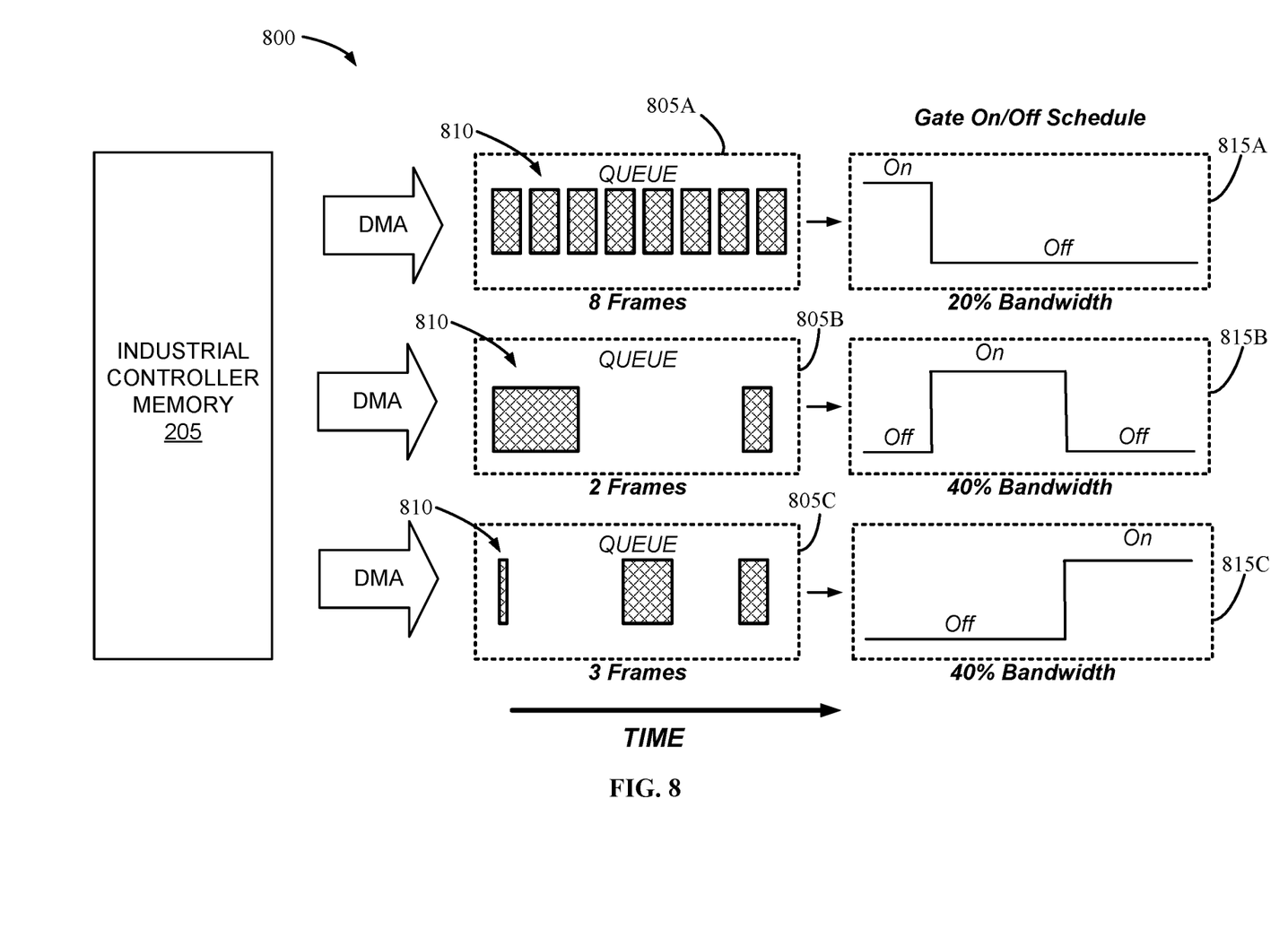
FIG. 8 illustrates an example distribution of network traffic diagram where at least one queue is experiencing congestion according to some configurations.
Figure 9:
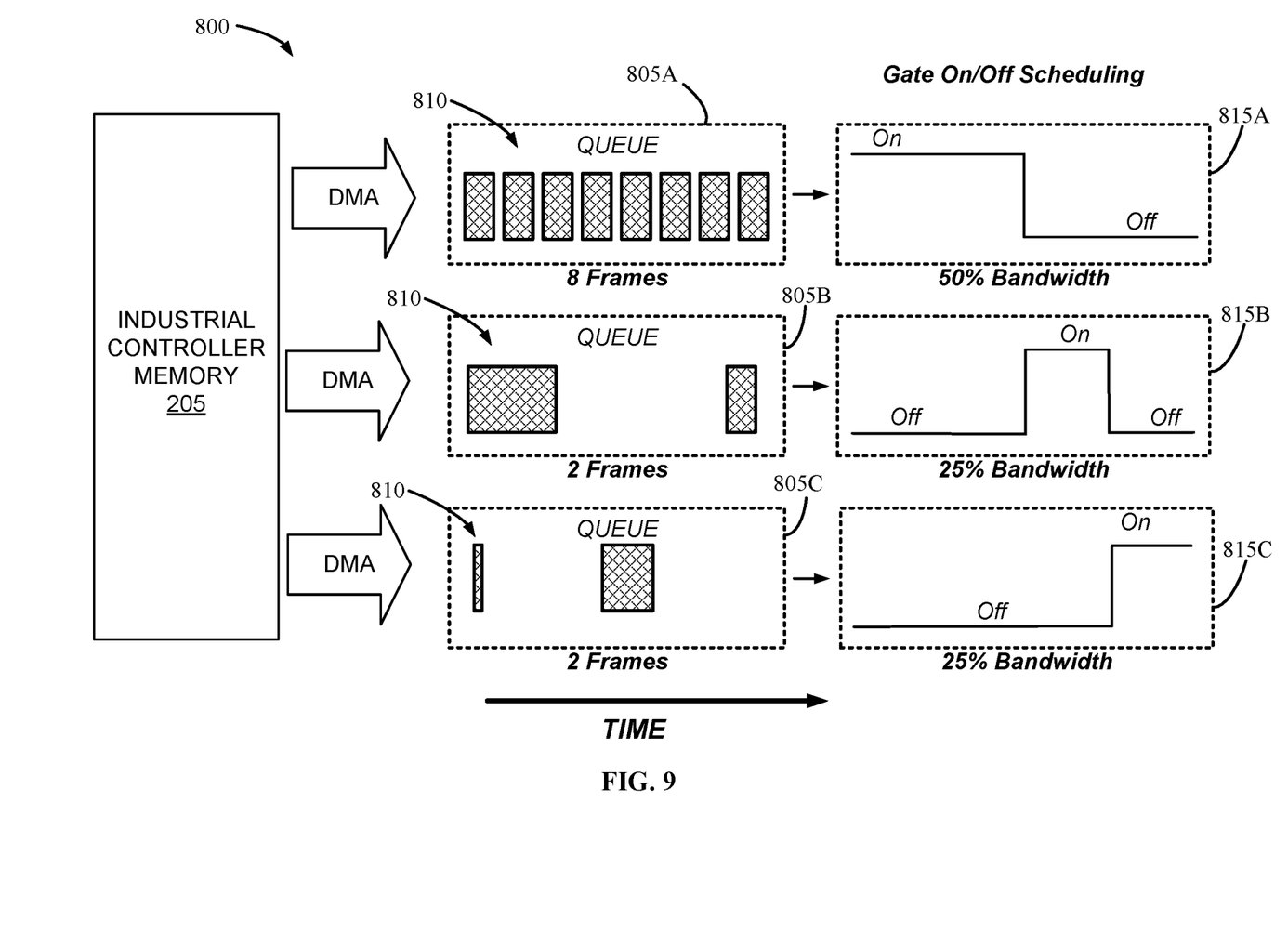
FIG. 9 illustrates the distribution of network traffic diagram of FIG. 8 after a redistribution of bandwidth according to some configurations.

FIG. 8 illustrates an example distribution of network traffic diagram 800 where at least one queue is experiencing congestion according to some configurations. As illustrated in FIG. 8, the distribution of network traffic diagram 800 includes a first queue 805A including eight frames of data packets, a second queue 805B including two frames of data packets, and a third queue 805C including three frames of data packets. The data packets are represented in FIGS. 8-9 as hatch-filled boxes associated with reference numeral 810. Each queue 805A, 805B, 805C may have (or be associated with) a gate on/off schedule. With reference to FIG. 8, the first queue 805A is associated with a first gate on/off schedule 815A, the second queue 805B is associated with a second gate on/off schedule 815B, and the third queue 805C is associated with a third gate on/off schedule 815C. The first gate on/off schedule 815A allocates 20% of available bandwidth to the first queue 805A. The second gate on/off schedule 815B allocates 40% of available bandwidth to the second queue 805B. The third gate on/off schedule 815C allocates 40% of available bandwidth to the third queue 805C.

As illustrated in FIG. 8, the first queue 805A is experiencing congestion (e.g., has the largest number of frames and the least amount of allocated bandwidth). As described in greater detail herein, the distribution of network traffic may be controlled such that bandwidth is balanced among any number of queues.

As one example, FIG. 9 illustrates the distribution of network traffic diagram 800 after a redistribution of bandwidth according to some configurations. As illustrated in FIG. 9, the gate on/off schedules 815A, 815B, and 815C for the queues 805A, 805B, and 805C has been adjusted (using the systems and methods described herein) to balance the bandwidth amongst the queues 805A, 805B, and 805C, such that network traffics evenly distributed among the queues 805A, 805B, and 805C. For instance, as illustrated in FIG. 9, the first gate on/off schedule 815A now allocates 50% of available bandwidth to the first queue 805A, the second gate on/off schedule 815B now allocates 25% of available bandwidth to the second queue 805B, and the third gate on/off schedule 815C now allocates 25% of available bandwidth to the third queue 805C. As a result, the third queue 805C now has two frames of data packets (as opposed to the three frames of data packets illustrated in FIG. 8).

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for controlling network traffic flow for time-sensitive networking in industrial systems, the system comprising:
an electronic processor configured to:
receive, from an industrial controller of an industrial system, queuing data for a first queue of the industrial controller;
determine, based on the queuing data, a distribution of network traffic within the industrial system, wherein the distribution of network traffic within the industrial system represents a flow of data packets between a plurality of networked hardware components of the industrial system, the plurality of networked hardware components including the industrial controller and the electronic processor; and
generate a network traffic model for display, the network traffic model including the distribution of network traffic within the industrial system.

2. The system of claim 1, wherein the queuing data includes a queue depth data for the first queue and a hardware timestamp for frames included within the first queue.

3. The system of claim 1, wherein the electronic processor is further configured to:
determine, based on the queuing data, an average queue depth for data packets of the first queue; and
determine, based on the queuing data, an average wait time for the data packets of the first queue,
wherein the distribution of network traffic within the industrial system is based on the average queue depth and the average wait time.

4. The system of claim 1, wherein the electronic processor is configured to receive the queuing data continuously, and wherein the network traffic model represents a live distribution of network traffic currently flowing between networked hardware components within the industrial system.

5. The system of claim 1, wherein the electronic processor is configured to receive the queuing data according to a predetermined schedule.

6. The system of claim 1, wherein the electronic processor is configured to receive the queuing data during operation of the industrial system.

7. The system of claim 1, wherein the industrial controller is a programmable logic controller implemented within the industrial system.

8. The system of claim 1, wherein the electronic processor is further configured to:
generate and transmit, based on the distribution of network traffic for the industrial system, a control signal to the industrial controller, wherein the control signal adjusts a network parameter for at least one queue of the industrial controller, and wherein adjustment of the network parameter for the at least one queue of the industrial controller causing an adjustment to network traffic of another industrial controller of the industrial system.

9. The system of claim 1, wherein the network traffic model includes a graphical representation of a network topology for the industrial system, wherein the network topology includes a plurality of nodes, wherein each node of the plurality of nodes represents a networked component of the industrial system, the network topology including an indication of the distribution of network traffic within the industrial system.

10. A method for controlling network traffic flow for time-sensitive networking in industrial systems, the method comprising:
receiving, from a programmable logic controller (PLC) of an industrial system, a first set of queue data for a first queue of the PLC;
receiving, from the PLC of the industrial system, a second set of queue data for a second queue of the PLC;
determining, with an electronic processor of a central network controller (CNC) of the industrial system, a distribution of network traffic for the industrial system based on the first set of queue data and the second set of queue data; and
generating, with the electronic processor of the CNC of the industrial system, a network traffic flow model for the industrial system indicating the distribution of network traffic for the industrial system.

11. The method of claim 10, further comprising:
determining, based on the first set of queue data, a first average queue depth and a first average wait time for the first queue; and
determining, based on the second set of queue data, a second average queue depth and a second average wait time for the second queue,
wherein the distribution of network traffic for the industrial system is based on the first average queue depth, the first average wait time, the second average queue depth, and the second average wait time.

12. The method of claim 10, wherein determining the distribution of network traffic for the industrial system includes determining an average arrival rate for the PLC.

13. The method of claim 10, further comprising:
adjusting, based on the distribution of network traffic for the industrial system, a timing parameter of the PLC.

14. The method of claim 10, further comprising:
generating, based on the distribution of network traffic for the industrial system, a control signal for the PLC; and
transmitting the control signal to the PLC, wherein the control signal adjusts the distribution of network traffic.

15. The method of claim 10, further comprising:
transmitting, with the electronic processor, the network traffic flow model for the industrial system to a display device for display to a user, wherein the network traffic flow model includes an indictor representative of an alert related to the distribution of network traffic for the industrial system, and wherein the indicator is interactive.

16. A non-transitory computer-readable medium storing instructions that, when executed by an electronic processor, perform a set of functions, the set of functions comprising:
receiving first queuing data for a first queue, the first queuing data including a first queue depth of data packets in the first queue and a first set of hardware timestamps for data packets in the first queue;
receiving second queuing data for a second queue, the second queuing data including a second queue depth of data packets in the second queue and a second set of hardware timestamps for data packets in the second queue;
determining, based on the first queuing data, a first average arrival time for data packets at the first queue;
determining, based on the second queuing data, a second average arrival time for data packets at the second queue;
determining, based on the first average arrival time and the second average arrival time, a distribution of network traffic for an industrial system associated with the first queue and the second queue, wherein the distribution of network traffic for the industrial system represents a flow of data packets between a plurality of networked hardware components of the industrial system; and
generating and transmitting a network traffic model based on the distribution of the network traffic for the industrial system to a display device for display to a user.

17. The computer-readable medium of claim 16, wherein the set of functions further comprises:
detecting network traffic congestion at the first queue;
generating a first control signal for the first queue, the first control signal increasing an allocation of servicing bandwidth at the first queue; and
generating a second control signal for the second queue, the second control signal decreasing an allocation of servicing bandwidth at the second queue.

18. The computer-readable medium of claim 16, wherein receiving the first queuing data includes receiving the first queuing data from a first industrial controller of the industrial system and wherein receiving the second queuing data includes receiving the second queuing data from a second industrial controller of the industrial system different from the first industrial controller.

19. The system of claim 2, wherein the queue depth data for the first queue is determined using a hardware queue counter of the industrial controller.

20. The system of claim 1, wherein the electronic processor is configured to receive the queuing data responsive to the first queue satisfying a queue depth threshold.

* * * * *